(12) United States Patent
Dong et al.

(10) Patent No.: US 6,526,526 B1
(45) Date of Patent: Feb. 25, 2003

(54) METHOD, SYSTEM AND PROGRAM FOR PERFORMING REMOTE USABILITY TESTING

(75) Inventors: Jianming Dong, Austin, TX (US); Shirley Lynn Martin, Austin, TX (US); John Martin Mullaly, Austin, TX (US); Alan Richard Tannenbaum, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/436,425

(22) Filed: Nov. 9, 1999

(51) Int. Cl.$^7$ ................................................. G06F 11/30
(52) U.S. Cl. ........................ 714/46; 717/125; 345/809
(58) Field of Search ...................... 714/46; 345/748, 345/752, 808, 809; 709/224; 717/125

(56) References Cited

U.S. PATENT DOCUMENTS

| | | | | |
|---|---|---|---|---|
| 5,724,262 | A | | 3/1998 | Ghahramani ............ 364/551.01 |
| 5,877,759 | A | * | 3/1999 | Bauer .......................... 345/708 |
| 5,883,639 | A | | 3/1999 | Walton et al. ............... 345/473 |
| 5,999,908 | A | * | 12/1999 | Abelow ....................... 434/118 |
| 6,237,138 | B1 | * | 5/2001 | Hameluck et al. .......... 702/182 |
| 2002/0002482 | A1 | * | 1/2002 | Thomas ....................... 705/10 |

FOREIGN PATENT DOCUMENTS

| | | | |
|---|---|---|---|
| WO | WO 95/16949 | 6/1995 | ............. G06F/3/00 |

OTHER PUBLICATIONS

IBM Tech. Disc. Bull., "Information Usability Data Gathering, Analysis and Presentation Tool", Nov. 1998, No. 6, vol. 31, pp. 136–137.*

* cited by examiner

*Primary Examiner*—Scott Baderman
(74) *Attorney, Agent, or Firm*—Marilyn Smith Dawkins; Bracewell & Patterson, L.L.P.

(57) ABSTRACT

A method, system and program for performing remote automated usability testing of a software application utilizing a data processing system connected within a network. In accordance with the method, system and program of the present invention, a user is provided with an automated usability test for a particular software application, wherein the automated usability test is to be activated while the particular software application is running utilizing a data processing system connected within a network. The user is prompted to perform particular tasks, in response to activation of the automated usability test while the software application is running. Data indicating the usability of the software application is gathered through user responses to the promptings. The gathered data is automatically sent to a data collection location at a remote site within the network, such that usability test data from multiple data processing systems in multiple remote user environments is gathered at a location remote from the multiple data processing systems.

31 Claims, 6 Drawing Sheets

METHOD, SYSTEM AND PROGRAM FOR PERFORMING REMOTE USABILITY TESTING

BACKGROUND OF THE INVENTION

1. Technical Field

The present invention relates in general to an improved data processing system and, in particular, an improved method, system and program for performing automated usability testing. Still more particularly, the present invention relates to an improved method, system and program for performing remote automated usability testing of a software application utilizing a data processing system connected within a network.

2. Description of the Related Art

Customers determine the quality of a system. Typically quality is thought of in terms of being well-built, long-lasting, or defect free. While these are critical components of quality, it is important to realize that if a customer considers a product difficult to use, the customer is not likely to use the product enough to find out how well built the product is. In instances where customers are internal, and may not have the choice of using a system or not, there are still many reasons for making the system as usable as possible.

A broad term that may be utilized to describe the quality of a system or product is "usability." A usability method, as defined herein, is a method for quantifying user interaction with a system. By quantifying user interaction with a system, the ability of a system or product to perform for users may be determined and utilized to aid in any re-engineering efforts. Multiple models for implementing usability methods have been created in order to quantify user interaction with a system. For example, U.S. Pat. No. 5,724,262, incorporated by reference herein, provides a model for collection and analysis of usability data from a system user population. By this model, data collected may include the number of problems encountered, number of actions taken, time apportioned to problems, learning time, number of calls for assistance, and the number of unsolved problems. Data collected is quantified by one of multiple methods provided.

While usability testing provides for quantifying user interaction, current means available for performing usability testing to collect user interaction data are limited. Standard usability testing, for example, collects feedback from users in a controlled lab environment where typically a task script prompts the user through the software in order to test particular aspects of the software. In a controlled environment, however, users are limited to those who are available to travel to the lab. In addition, the amount of time that users are able to spend in lab testing is often limited. Furthermore, users tend to behave differently in a controlled lab environment than in their own environment where the product would typically be utilized.

One method for receiving user feedback outside of the controlled lab environment is through posting questionnaires on the internet or through other media with the software to be tested. Users respond to questions posed about particular software independent of their interaction with the software. By this method of remote testing, a user may provide feedback at their convenience. However, by this method, the step-by-step task scripts that are typically provided in the controlled lab environment and the ability to measure times and mouse movement are not available and thus this method of remote testing is limited in use.

It would be preferably to provide a method for performing remote usability studies utilizing step-by-step task scripts to guide users and collecting other data such as times and mouse movement. Further, it would be preferable that users in multiple environments provide usability data to a location remote from each of the multiple environments.

SUMMARY OF THE INVENTION

In view of the foregoing, it is therefore an object of the present invention to provide an improved method and system for data processing.

It is another object of the present invention to provide an improved method, system and program for performing automated usability testing.

It is yet another object of the present invention to provide an improved method, system and program for performing remote automated usability testing of a software application utilizing a data processing system connected with a network.

In accordance with the method, system and program of the present invention, a user is provided with an automated usability test for a particular software application, wherein the automated usability test is to be activated while the particular software application is running utilizing a data processing system connected within a network. The user is prompted to perform particular tasks, in response to activation of the automated usability test while the software application is running. Data indicating the usability of the software application is gathered through user responses to the promptings. The gathered data is automatically sent to a data collection location at a remote site within the network, such that usability test data from multiple data processing systems in multiple remote user environments is gathered at a location remote from the multiple data processing systems.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention may be executed in a variety of systems, including a variety of computers under a number of different operating systems. The computer may be, for example, a personal computer, a network computer, a midrange computer or a mainframe computer. In addition, the computer may be a stand-alone system or part of a network such as a local-area network (LAN) or a wide-area network (WAN). For the purposes of illustration, a preferred embodiment of the present invention, as described below, is implemented on a personal computer, such as the Aptiva series manufactured by International Business Machines Corporation.

Figure 1:
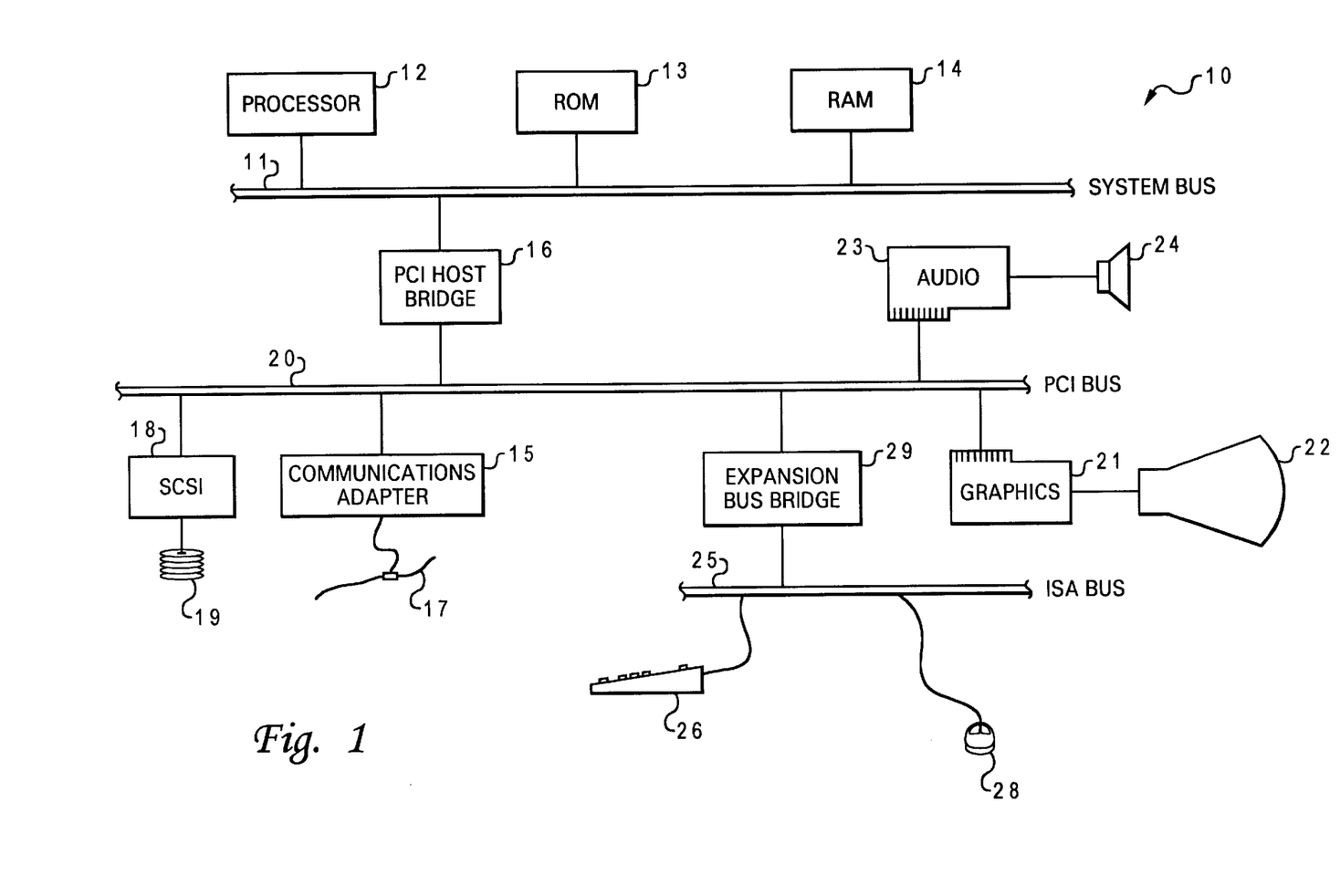
FIG. 1 depicts a block diagram of a typical computer system that may utilize a preferred embodiment of the present invention.

Referring now to the drawings and in particular to FIG. 1, there is depicted a block diagram of a typical computer system that may utilize a preferred embodiment of the present invention. As shown, a processor (CPU) 12, a read-only memory (ROM) 13, and a Random-Access Memory (RAM) 14 are connected to a system bus 11 of a computer system 10. CPU 12, ROM 13, and RAM 14 are also coupled to a PCI local bus 20 of computer system 10 through a PCI host bridge 16. PCI host bridge 16 provides a low latency path through which processor 12 may directly access PCI devices mapped anywhere within bus memory and/or I/O address spaces. PCI host bridge 16 also provides a high bandwidth path for allowing PCI devices to directly access RAM 14.

Also attaching to PCI local bus 20 are communications interface 15, small computer system interface (SCSI) 18, and expansion bus bridge 29. Communications interface 15 is for connecting computer system 10 to a network 17. SCSI 18 is utilized to control high-speed SCSI disk drive 19. Expansion bus bridge 29, such as a PCI-to-ISA bus bridge, may be utilized for coupling ISA bus 25 to PCI local bus 20. As shown, a keyboard 26 and a mouse 28 are attached to ISA bus 25 for performing certain basic I/O functions. In addition, an audio adapter 23 is attached to PCI local bus 20 for controlling audio output through speaker 24. A graphics adapter 21 is also attached to PCI local bus 20 for controlling visual output through display monitor 22. In alternate embodiments of the present invention, additional peripheral components may be added.

Computer system 10 also preferably includes an interface such as a graphical user interface (GUI) and an operating system (OS) that reside within machine readable media to direct the operation of computer system 10. Any suitable machine-readable media may retain the GUI and OS, such as RAM 14, ROM 13, SCSI disk drive 19, and other disk and/or tape drive (e.g. magnetic diskette, magnetic tape, CD-ROM, optical disk, or other suitable storage media). Any suitable GUI and OS may direct CPU 12. For example, the AIX operating system is one of IBM's operating systems which may be implemented.

Further, computer system 10 preferably includes at least one software application (e.g. program product) that resides within machine readable media. A software application contains instructions that when executed on CPU 12 carry out the operations depicted in the flow chart of FIG. 4 and others described herein.

Preferably, computer system 10 communicates with at least one other data processing system within network 17. As will be further described, in the present invention computer system 10 may receive additional data, such as scripting, for executing a test wizard from network 17. A wizard is typically utilized as a utility within an application that provides users with instructions and in the present invention the test wizard is utilized to guide users through a usability study for a particular software application and gather data therefrom. The data gathered from the user performing a usability study is sent, typically via e-mail, to a particular data processing system within network 17 which serves as a data collection location for responses to the usability study.

Figure 2:
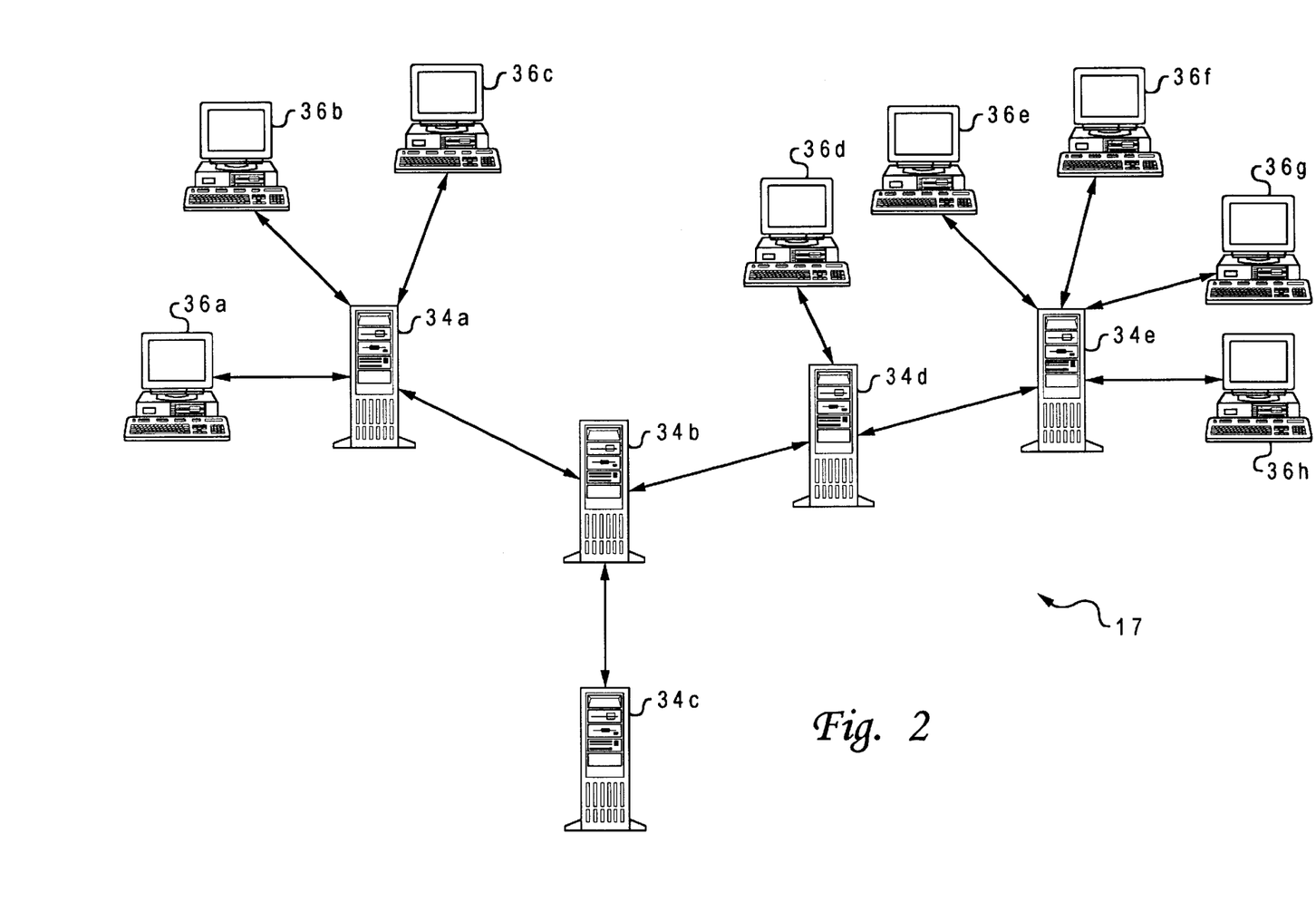
FIG. 2 illustrates a block diagram of a network system in accordance with a preferred embodiment of the present invention.

With reference now to FIG. 2, there is illustrated a block diagram of a network system in accordance with a preferred embodiment of the present invention. An example of a system comprising network 17 is depicted. Multiple computers systems 36a–36h are depicted which each may be utilized for performing the remote usability testing of the present invention. Each of multiple computer systems 36a–36h is connected to at least one server of servers 34a–34e. For example, as depicted, computer systems 36a–36c communicate with server 34a. Server 34a communicates with server 34b. Server 34b communicates with servers 34d and 34c, and so forth as is well known in the art. As will be understood by one well known in the art, alternate network topologies may be utilized with the method and system of the present invention. Further, as will be understood by one well known in the art, multiple computer systems may communicate with a server from multiple remote locations.

In the example depicted, if server 34c is the remote data collection location for storing data gathered from remote usability study testing, then each of computer systems 36a–36h can communicate with remote server 34c through other servers connected thereto and pass data from remote usability testing. In addition, each of computer systems 36a–36h may receive test wizard scripting via a server such as server 34c.

Figure 3:
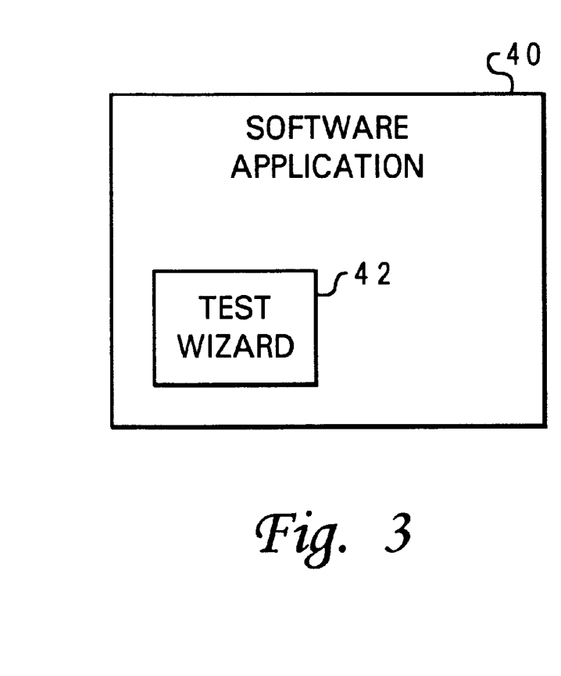
FIG. 3 depicts a block diagram of a test wizard application embedded within a software application in accordance with a preferred embodiment of the present invention.

Referring now to FIG. 3, there is illustrated a block diagram of a test wizard application embedded within a software application. In the case of FIG. 3, a software application 40 is the system on which the usability testing is to be performed. A test wizard 42 is provided for performing usability testing of software application 40. In the present embodiment, test wizard 42, is embedded within software application 40 such that when test wizard 42 is activated by the user while software application 40 is running, test wizard 42 may operate simultaneously within software application 40. Software applications may include software applications, operating systems and others. In alternate embodiments, test wizard 42 may exist independent of software application 40, however operate simultaneously within software application when activated by the user. Further, test wizard 42 may be executable within multiple software applications.

Figure 4:
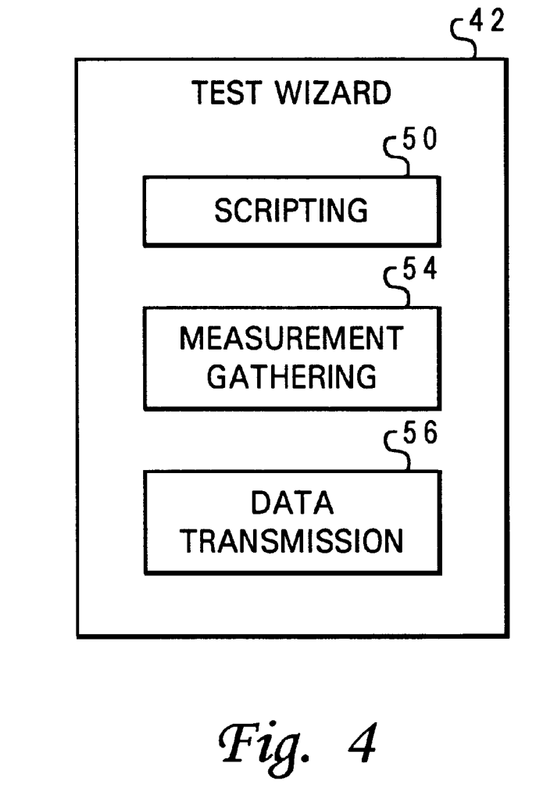
FIG. 4 illustrates a block diagram of components of a test wizard in accordance with a preferred embodiment of the present invention.

With reference now to FIG. 4, there is depicted a block diagram of components of a test wizard. Included within test wizard 42, the following functions may be performed: scripting 50, measurement gathering 54, and data transmission 56. Scripting 50 includes preferably a GUI which displays instructions and questions to a user and controls what is being displayed from the software application. Through scripting 50, a user can directly provide data concerning the usability of the system. In one embodiment, all data for controlling scripting 50, is initially included with test wizard 42. In an alternate embodiment, additional data for scripting 50 may be provided to test wizard 42 at a later time, for example, via a network. Measurement gathering 54 includes diagnostic tools which may indirectly gather data from the user. For example, the time taken for a user to perform a particular task requested in scripting 50 may be recorded by measurement gathering 54. Finally, data transmission 56 includes compiling data gathered directly and indirectly into a format which can then be transmitted, preferably automatically. Preferably, data transmission 56 includes direct transmission of gathered data through a LAN or other similar network service. For users who do not have access to a LAN or other similar network service, instructions may be provided for saving the gathered data to a signal-bearing media which can be easily returned (e.g. floppy disk). Each of the components within test wizard 42 may be supplemented from data from a remote location. For example, the contents of scripting 50 may be located locally with the test wizard, or remotely on a network.

Figure 5A:
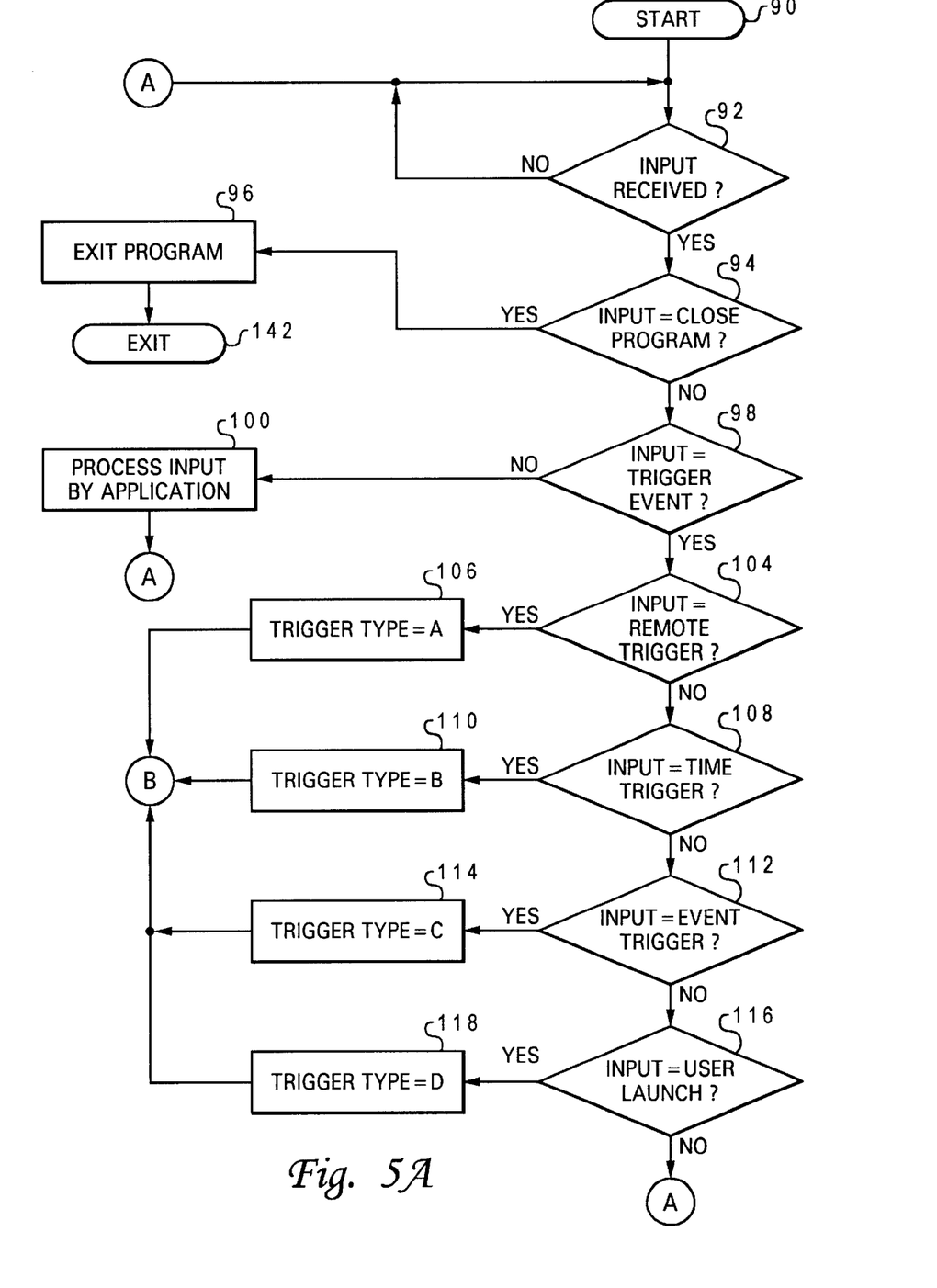
FIG. 5 depicts a high-level logic flow diagram of a method for performing a usability test in accordance with a preferred embodiment of the present invention.
Figure 5B:
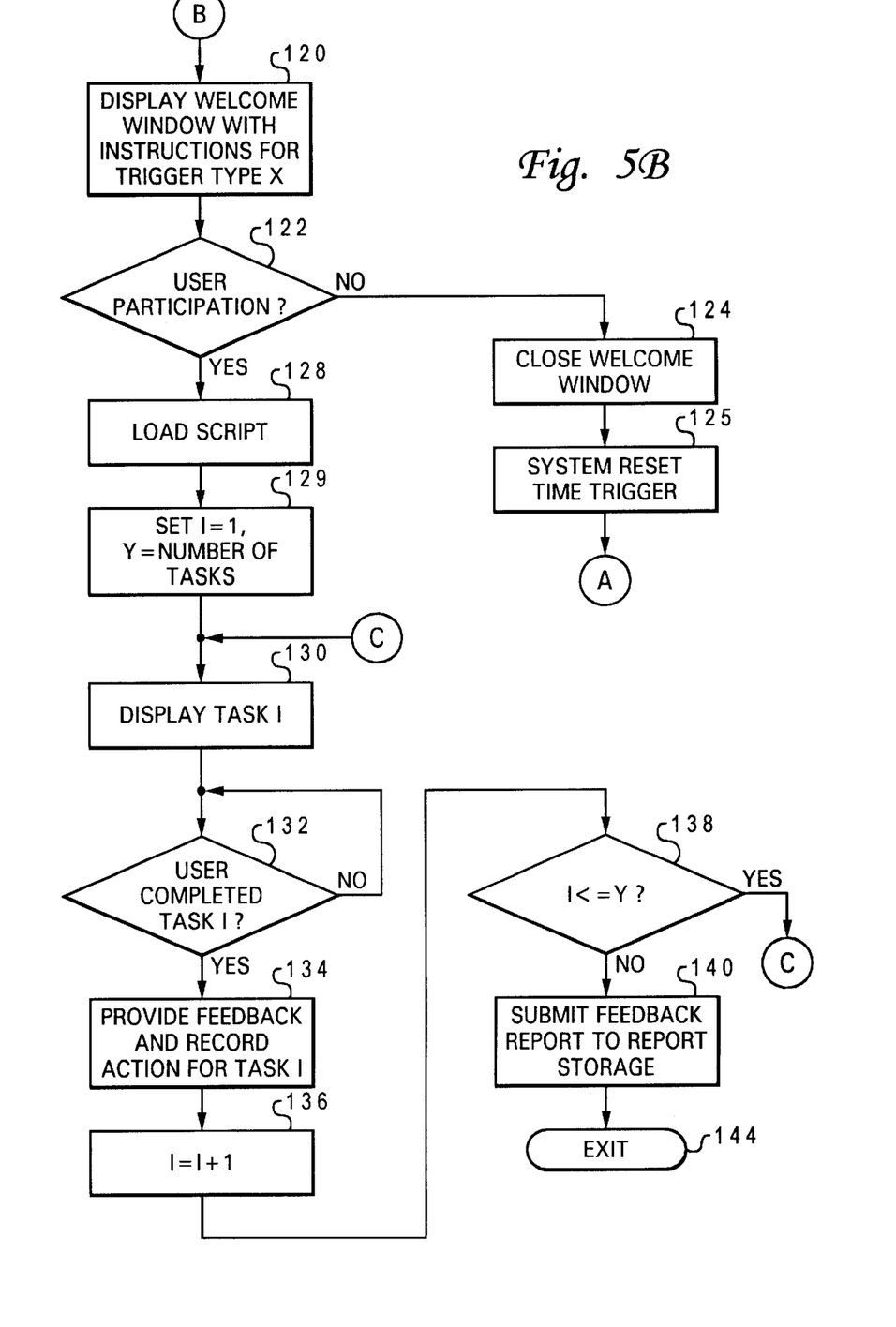

Referring now to FIG. 5, there is illustrated a high-level logic flow diagram of a method for performing a usability test in accordance with a preferred embodiment of the present invention. As depicted, the process starts at block 90. A determination is then made as to whether or not an input has been received, as illustrated at block 92. If an input has not been received, the process returns to block 92. Otherwise, if an input has been received, then a determination is made as to whether or not the input designates closing the program, as illustrated at block 94. If the input designates closing the program, the program is then exited, as depicted at block 96. Thereafter, the process exits as illustrated at block 142. Otherwise, if the input does not designate closing the program, then a determination is made as to whether or not an input for a trigger event has been received, as depicted at block 98.

At block 98, if an input for a trigger event has not been received, the process proceeds to block 100. Block 100 illustrates processing the input by the open application. Thereafter, the process returns to block 92. Otherwise, at block 98, if an input for a trigger event has been received, the process passes to block 104.

Subsequently, a determination is made as to whether or not the input type is a remote trigger. A remote trigger input type arrives via network and may be in the form of a structured field, multi-purpose internet mail extension (MIME), special text string and other data inputs. If the input type is a remote trigger, then the trigger type is set to type A, as illustrated at block 106. Thereafter the process passes to block 120. Otherwise, at block 104, if the input type is not a remote trigger, the process proceeds to block 108.

Block 108 depicts a determination as to whether or not the input type is a time trigger of multiple time triggers. Each of the multiple time triggers may be started at different times. In one example, a time trigger may occur when the system clock of a data processing system reaches a particular time. In another example, a time trigger may occur after an application has been installed for a particular amount of time. In addition, different portions of the test wizard scripting may be initiated by different time triggers. If the input type is a time trigger, then the trigger type is set to type B as illustrated at block 110. Thereafter the process passes to block 120. Otherwise, at block 108, if the input type is not a time trigger, then the process passes to block 112.

Block 112 illustrates a determination as to whether or not the input type is an event trigger of multiple event triggers. If the input type is an event trigger, then the trigger type is set to type C, as depicted at block 114. Thereafter, the process passes to block 120. Otherwise, at block 112, if the input type is not an event trigger, then the process passes to block 116.

Block 116 depicts a determination as to whether or not the input type is a user launch of the test wizard. If the input type is a user launch of the test wizard, then the trigger type is set to type D, as illustrated at block 118. Thereafter, the process passes to block 120. Otherwise, at block 116, if the input type is not a user launch, then the process returns to block 92.

Block 120 illustrates displaying a welcome window with instructions for trigger type X, where X is either A, B, C or D. Further, the welcome window provides the user with an option to select to participate or not participate. A determination of whether or not the user selects to participate is made, as depicted at block 122. If the user determines not to participate, the welcome window is closed, as illustrated at block 124. Thereafter, the system resets the time trigger, as depicted at block 125 and returns to block 92. Otherwise, if the user determines to participate, the process passes to block 128.

Subsequently the script for trigger type X is loaded from local or remote storage, as depicted at block 128. Next, block 129 depicts setting I to "1" and Y to the total number of tasks. Thereafter, block 130 illustrates displaying a task I. Next, block 132 depicts a determination as to whether or not the user has completed task I. If the user has not completed task I, the process iterates at block 132. Otherwise if the user has completed task I, the process passes to block 134. Block 134, next illustrates providing feedback and recorded action for task I. Thereafter, block 136 depicts performing the calculation I=I+1. Next, block 138 depicts a determination as to whether or not I is less than or equal to Y. If I is less than or equal to Y, the process returns to block 130. If I is not less than or equal to Y then feedback and recorded actions are submitted, as illustrated at block 140, and the process exits at block 144.

Figure 6:
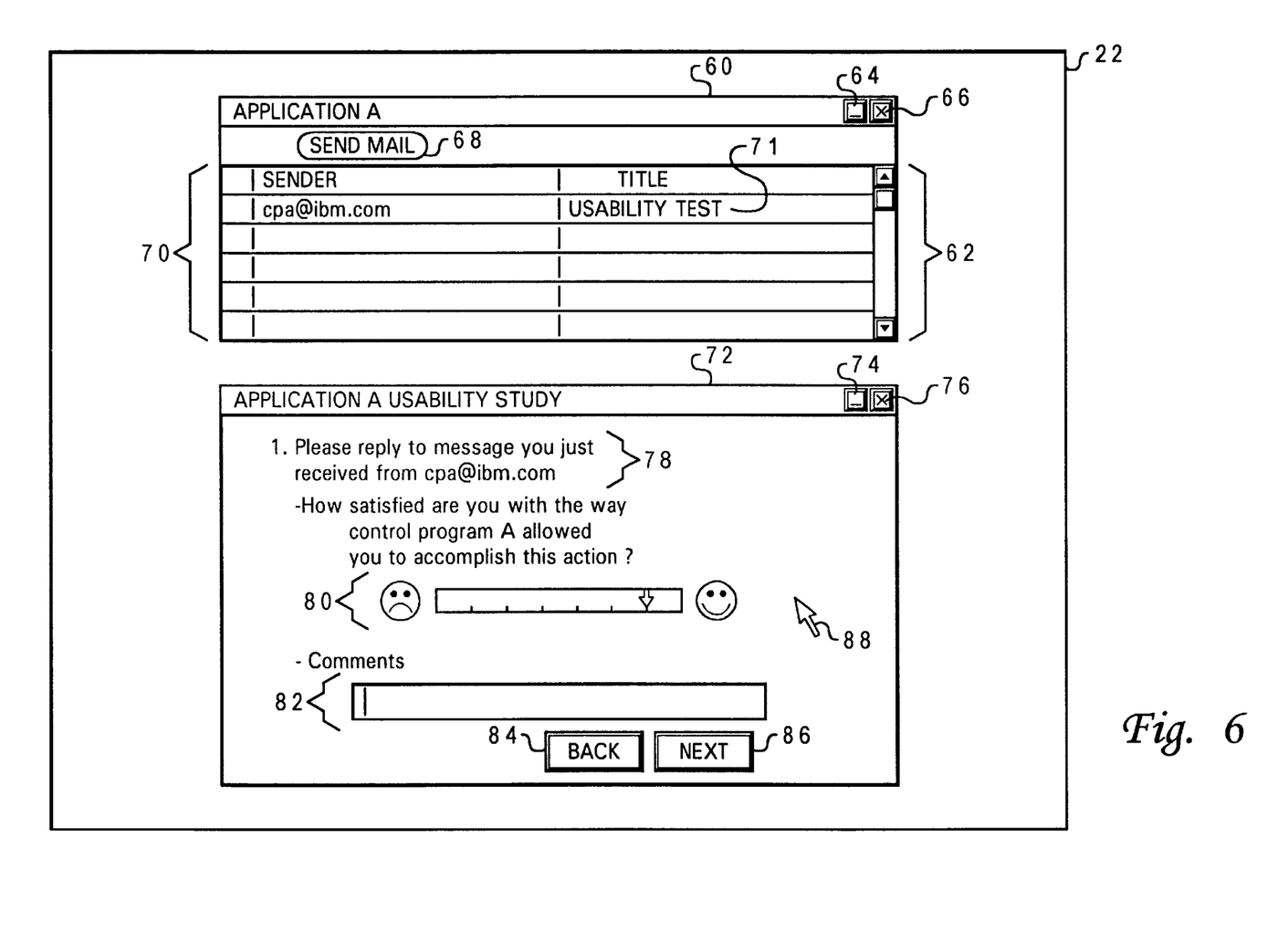
FIG. 6 illustrates a pictorial representation of a software application within which a test wizard operates simultaneously.

With reference now to FIG. 6, there is depicted a pictorial representation of a software application within which a test wizard operates simultaneously. The graphical user interface of application A window 60 may be displayed in display monitor 22 of computer system 10 (of FIG. 1) and is only exemplary of one type of graphical user interface. As is depicted, window 60 includes textual display area 70 for displaying mail messages by sender and title, scrolling graphical component 62 for scrolling through textual display 70, graphic representation 68 of a program function "send mail" which is available, iconic representation 64 which provides a function to reduce the size of window 60, and iconic representation 66 which provides a function to close application A. In particular, textual display area 70 displays mail messages by sender and title and currently includes a message from "cpa@ibm.com" titled "Usability Test" as depicted at reference numeral 71.

A graphical user interface of application A usability study window 72 may also be displayed in display monitor 22, simultaneously with application A window 60. In one example, as depicted, a task request for the user to "Please reply to message you just received from cpa@ibm.com" as depicted at reference numeral 78. To complete this task, the user returns to application A window 60 and performs the requested task. In particular, the user may utilize graphical selection device 88, as is well known in the art, to direct the performance of the requested task. Next, as illustrated, window 72 includes a feedback request graphical bar 80 where the user can select a position along graphical bar 80 to indicate satisfaction in performing the requested task. In addition, the user may provide feedback by typing a comment into comments graphical area 82. To advance to the next task window, the user may select graphical representation 86, or to return to a previous task window, the user may select graphical representation 84. In particular, the user may advance to each task window at their own pace. Further, upon reaching the final task window, the user will be prompted to indicate that they have completed the usability study, whereafter the user results are returned to a data collection location.

It is also important to note that, although the present invention has been described in the context of a fully functional computer system, those skilled in the art will appreciate that the mechanisms of the present invention are capable of being distributed as a program product in a variety of forms, and that the present invention applies equally regardless of the particular type of signal-bearing media utilized to actually carry out the distribution. Examples of signal-bearing media include, but are not limited to, recordable-type media such as floppy disks or CD ROMs and transmission-type media such as analogue or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for performing remote automated usability testing of a software application utilizing a data processing system connected within a network, said method comprising the steps of:

providing a user with an automated usability test for a particular software application, wherein said automated usability test is to be activated while said particular software application is running utilizing a data processing system connected within a network;

prompting said user to perform particular tasks, in response to activation of said automated usability test while said software application is running;

gathering data indicating the usability of said software application through user responses to said promptings;

automatically sending said gathered data to a data collection location at a remote site within said network, such that usability test data from a plurality of data processing systems in a plurality of remote user environments is gathered at a location remote from said plurality of data processing systems;

activating said automated usability test while said software application is running, in response to a non-user input; and utilizing a remote trigger input to activate said automated usability test while said software application is running, where said remote trigger is a data input received from said network.

2. The method of performing remote automated usability testing according to claim 1, said method further comprising the step of:

activating said automated usability test while said software application is running, in response to a user input.

3. The method for performing remote automated usability testing according to claim 1, said step of gathering data indicating the usability of said software application through user responses to said promptings, further comprising the step of:

recording indirect data detected in response to said user interacting with said software application into a textual format.

4. The method for performing remote automated usability testing according to claim 1, said step of automatically sending said gathered data to a data collection location at a remote site within said network, such that usability test data from a plurality of data processing systems in a plurality of remote user environments is gathered at a location remote from said plurality of data processing systems, further comprising the step of:

sending an electronic mail providing said gathered data to an electronic mail address representing said data collection location.

5. A method for performing remote automated usability testing of a software application utilizing a data processing system connected within a network, said method comprising the steps of:

providing a user with an automated usability test for a particular software application, wherein said automated usability test is to be activated while said particular software application is running utilizing a data processing system connected within a network;

prompting said user to perform particular tasks, in response to activation of said automated usability test while said software application is running;

gathering data indicating the usability of said software application through user responses to said promptings;

automatically sending said gathered data to a data collection location at a remote site within said network, such that usability test data from a plurality of data processing systems in a plurality of remote user environments is gathered at a location remote from said plurality of data processing systems;

activating said automated usability test while said software application is running, in response to a non-user input; and utilizing a time trigger input to activate said automated usability test while said software application is running, where said time trigger is a data input received from said data processing system in response to a particular time expiring according to said data processing system.

6. A method for performing remote automated usability testing of a software application utilizing a data processing system connected with a network, said method comprising the steps of:

providing a user with an automated usability test for a particular software application, wherein said automated usability test is to be activated while said particular software application is running utilizing a data processing system connected within a network;

prompting said user to perform particular tasks, in response to activation of said automated usability test while said software application is running;

gathering data indicating the usability of said software application through user responses to said promptings;

automatically sending said gathered data to a data collection location at a remote site within said network, such that usability test data from a plurality of data processing systems in a plurality of remote user environments is gathered at a location remote from said plurality of data processing systems;

activating said automated usability test while said software application is running, in response to a non-user input; and utilizing an event trigger input to activate said automated usability test while said software application is running, where said event trigger is a data input received from said data processing system in response to a particular event occurring within said data processing system.

7. The method for performing remote automated usability testing according to claim 6, said step of providing a user with an automated usability test for a particular software applicable, further comprises the step of:

including a test wizard for controlling the functions of said automated usability test.

8. The method for performing remote automated usability testing according to claim 6, said step of prompting said user to perform particular tasks, in response to activation of said automated usability test while said software application is running, further comprising the step of:

provoking a graphical display window for said automated usability test within the same display as at least one graphical display window for said software application.

9. The method for performing remote automated usability testing according to claim 8, said step of gathering data indicating the usability of said software application through user responses to said promptings, further comprising the step of:

recording direct data entered by said user into a textual format.

10. A method for performing remote automated usability testing of a software application utilizing a data processing system connected within a network, said method comprising the steps of:

providing a user with an automated usability test for a particular software application, wherein said automated usability test is to be activated while said particular software application is running utilizing a data processing system connected within a network;

prompting said user to perform particular tasks, in response to activation of said automated usability test while said software application is running;

gathering data indicating the usability of said software application through user responses to said promptings;

automatically sending said gathered data to a data collection location at a remote site within said network, such that usability test data from a plurality of data processing systems in a plurality of remote user environments is gathered at a location remote from said plurality of data processing systems;

providing a graphical display window for said automated usability test within the same display as at least one graphical display window for said software application; and providing a particular script of tasks within said graphical display window for said automated usability test dependent upon the type of input which activated said automated usability test.

11. A method for performing remote automated usability testing of a software application utilizing a data processing system connected within a network, said method comprising the steps of:

providing a user with an automated usability test for a particular software application, wherein said automated usability test is to be activated while said particular software application is running utilizing a data processing system connected within a network;

prompting said user to perform particular tasks, in response to activation of said automated usability test while said software application is running;

gathering data indicating the usability of said software application through user responses to said promptings;

automatically sending said gathered data to a data collection location at a remote site within said network, such that usability test data from a plurality of data processing systems in a plurality of remote user environments is gathered at a location remote from said plurality of data processing systems; and receiving scripting data for said automated usability test via a network connection, where said scripting data prompts said user to perform particular tasks.

12. A system of performing remote automated usability testing of a software application utilizing a data processing system connected within a network, said system comprising:

means for providing a user with an automated usability test for a particular software application, wherein said automated usability test is to be activated while said particular software application is running utilizing a data processing system connected within a network;

means for prompting said user to perform particular tasks, in response to activation of said automated usability test while said software application is running;

means for gathering data indicating the usability of said software application through user responses to said promptings;

means for automatically sending said gathered data to a data collection location at a remote site within said network, such that usability test data from a plurality of data processing systems in a plurality of remote user environments is gathered at a location remote from said plurality of data processing systems;

means for activating said automated usability test while said software application is running, in response to a non-user input; and means for utilizing a remote trigger input to activate said automated usability test while said software application is running, where said remote trigger is a data input received from said network.

13. The system of performing remote automated usability testing according to claim 12, said system further comprising:

means for activating said automated usability test while said software application is running, in response to a user input.

14. The system of performing remote automated usability testing according to claim 12, said means for gathering data indicating the usability of said software application through user responses to said promptings, further comprising:

means for recording indirect data detected in response to said user interacting with said software application into a textual format.

15. The system of performing remote automated usability testing according to claim 12, said means for automatically sending said gathered data to a data collection location at a remote site within said network, such that usability test data from a plurality of data processing systems in a plurality of remote user environments is gathered at a location remote from said plurality of data processing systems, further comprising:

means for sending an electronic mail providing said gathered data to an electronic mail address representing said data collection location.

16. A system of performing remote automated usability testing of a software application utilizing a data processing system connected within a network, said system comprising:

means for providing a user with an automated usability test for a particular software application, wherein said automated usability test is to be activated while said particular software application is running utilizing a data processing system connected within a network;

means for prompting said user to perform particular tasks, in response to activation of said automated usability test while said software application is running;

means for gathering data indicating the usability of said software application through user responses to said promptings;

means for automatically sending said gathered data to a data collection location at a remote site within said network, such that usability test data from a plurality of data processing systems in a plurality of remote user environments is gathered at a location remote from said plurality of data processing systems;

means for activating said automated usability test while said software application is running, in response to a non-user input; and means for utilizing a time trigger input to activate said automated usability test while said software application is running, where said time trigger is a data input received from said data processing system in response to a particular time expiring according to said data processing system.

17. A system of performing remote automated usability testing of a software application utilizing a data processing system connected within a network, said system comprising:

means for proving a user with an automated usability test for a particular software application, wherein said automated usability test is to be activated while said particular software application is running utilizing a data processing system connected within a network;

means for prompting said user to perform particular tasks, in response to activation of said automated usability test while said software application is running;

means for gathering data indicating the usability of said software application through user responses to said promptings;

means for automatically sending said gathered data to a data collection location at a remote site within said network, such that usability test data from a plurality of data processing systems in a plurality of remote user environments is gathered at a location remote from said plurality of data processing systems;

means for activating said automated usability test while said software application is running, in response to a non-user input; and means for utilizing an event trigger input to activate said automated usability test while said software application is running, where said event trigger is a data input received from said data processing system in response to a particular event occurring within said data processing system.

18. The system of performing remote automated usability testing according to claim 17, said means for proving a user with an automated usability test for a particular software application, further comprising:

means for including a test wizard for controlling the functions of said automated usability test.

19. The system of performing remote automated usability testing according to claim 17, said means for prompting said user to perform particular tasks, in response to activation of said automated usability test while said software application is running, further comprising:

means for providing a graphical display window for said automated usability test within the same display as at least one graphical display window for said software application.

20. The system of performing remote automated usability testing according to claim 19, said means for gathering data indicating the usability of said software application through user responses to said promptings, further comprising:

means for recording direct data entered by said user into a textual format.

21. A system of performing remote automated usability testing of a software application utilizing a data processing system connected within a network, said system comprising:

means for providing a user with an automated usability test for a particular software application, wherein said automated usability test is to be activated while said particular software application is running utilizing a data processing system connected within a network;

means for prompting said user to perform particular tasks, in response to activation of said automated usability test while said software application is running;

means for gathering data indicating the usability of said software application through user responses to said promptings;

means for automatically sending said gathered data to a data collection location at a remote site within said network, such that usability test data from a plurality of data processing systems in a plurality of remote user environments is gathered at a location remote from said plurality of data processing systems;

means for providing a graphical display window for said automated usability test within the same display as at least one graphical display window for said software application; and means for providing a particular script of tasks within said graphical display window for said automated usability test dependent upon the type of input which activated said automated usability test.

22. A system of performing remote automated usability testing of a software application utilizing a data processing system connected within a network, said system comprising:

means for providing a user with an automated usability test for a particular software application, wherein said automated usability test is to be activated while said particular software application is running utilizing a data processing system connected within a network;

means for prompting said user to perform particular tasks, in response to activation of said automated usability test while said software application is running;

means for gathering data indicating the usability of said software application through user responses to said promptings;

means for automatically sending said gathered data to a data collection location at a remote site within said network, such that usability test data from a plurality of data processing systems in a plurality of remote user environments is gathered at a location remote from said plurality of data processing systems; and means for receiving scripting data for said automated usability test via a network connection, where said scripting data prompts said user to perform particular tasks.

23. A program, on a computer usable medium having computer readable program code means, said program comprising:

means for enabling the receipt of an automated usability test for a particular software application, wherein said automated usability test is enabled to be activated while said particular software application is running utilizing a data processing system connected within a network;

means for generating a prompt for a user to perform particular tasks, in response to activation of said automated usability test while said software application is running;

means for retrieving data indicating the usability of said software application through user responses to said promptings;

means for enabling automatic transmission of said retrieved data to a data collection location at a remote site within said network;

means for enabling the activation of said automated usability test while said software application is running, in response to a non-user input; and means for enabling the receipt of a remote trigger input to activate said automated usability test while said software application is running, where said remote trigger is a data input received from said network.

24. The program according to claim 23, said program further comprising:

means for enabling the activation of said automated usability test while said software application is running, in response to a user input.

25. A program, on a computer usable medium having computer readable program code means, said program comprising:

means for enabling the receipt of an automated usability test for a particular software application, wherein said automated usability test is enabled to be activated while said particular software application is running utilizing a data processing system connected within a network;

means for generating a prompt for a user to perform particular tasks, in response to activation of said automated usability test while said software application is running;

means for retrieving data indicating the usability of said software application through user responses to said promptings;

means for enabling automatic transmission of said retrieved data to a data collection location at a remote site within said network;

means for enabling the activation of said automated usability test while said software application is running, in response to a non-user input; and means for enabling the receipt of a time trigger input to activate said automated usability test while said software application is running, where said time trigger is a data input received from said data processing system in response to a particular time expiring according to said data processing system.

26. A program, on a computer usable medium having computer readable program code means, said program comprising:

means for enabling the receipt of an automated usability test for a particular software application, wherein said automated usability test is enabled to be activated while said particular software application is running utilizing a data processing system connected within a network;

means for generating a prompt for a user to perform particular tasks, in response to activation of said automated usability test while said software application is running;

means for retrieving data indicating the usability of said software application through user responses to said promptings;

means for enabling automatic transmission of said retrieved data to a data collection location at a remote site within said network;

means for enabling the activation of said automated usability test while said software application is running, in response to a non-user input; and means for enabling the receipt of an event trigger input to activate said automated usability test while said software application is running, where said event trigger is a data input received from said data processing system in response in a particular event occurring within said data processing system.

27. The program according to claim 26, said program further comprising:

means for enabling a graphical display window for said automated usability test within the same display as at least one graphical display window for said software application.

28. A program, on a computer usable medium having computer readable program code means, said program comprising:

means for enabling the receipt of an automated usability test for a particular software application, wherein said automated usability test is enabled to be activated while said particular software application is running utilizing a data processing system connected within a network;

means for generating a prompt for a user to perform particular tasks, in response to activation of said automated usability test while said software application is running;

means for retrieving data indicating the usability of said software application through user responses to said promptings;

means for enabling automatic transmission of said retrieved data to a data collection location at a remote site within said network;

means for enabling a graphical display window for said automated usability test within the same display as at least one graphical display window for said software application; and means for generating a particular script of tasks within said graphical display window for said automated usability test dependent upon the type of input which activated said automated usability test.

29. The program according to claim 28, said program further comprising:

means for retrieving indirect data detected in response to said user interacting with said software application into a textual format.

30. The program according to claim 28, said program further comprising:

means for enabling the transmission of an electronic mail providing said retrieved data to an electronic mail address representing said data collection location.

31. A program, on a computer usable medium having computer readable program code means, said program comprising:

means for enabling the receipt of an automated usability test for a particular software application, wherein said automated usability test is enabled to be activated while said particular software application is running utilizing a data processing system connected within a network;

means for generating a prompt for a user to perform particular tasks, in response to activation of said automated usability test while said software application is running;

means for retrieving data indicating the usability of said software application through user responses to said promptings;

means for enabling automatic transmission of said retrieved data to a data collection location at a remote site within said network; and means for enabling the receipt of scripting data for said automated usability test via a network connection, where said scripting data prompts said user to perform particular tasks.

* * * * *

UNITED STATES PATENT AND TRADEMARK OFFICE
CERTIFICATE OF CORRECTION

PATENT NO.    : 6,526,526 B1
DATED         : February 25, 2003
INVENTOR(S)   : Dong et al.

It is certified that error appears in the above-identified patent and that said Letters Patent is hereby corrected as shown below:

<u>Column 11,</u>
Line 47, after the words "means for" delete "proving" and insert -- providing --.

Signed and Sealed this

Twenty-sixth Day of August, 2003

JAMES E. ROGAN
*Director of the United States Patent and Trademark Office*